US008499368B2

(12) United States Patent
Wunderlich et al.

(10) Patent No.: US 8,499,368 B2
(45) Date of Patent: Aug. 6, 2013

(54) SPACE-SAVING TOILET SYSTEM

(75) Inventors: Frank Wunderlich, Netphen (DE); Volker Müller, Hilchenbach (DE)

(73) Assignee: Dometic GmbH, Siegen (DE)

( * ) Notice: Subject to any disclaimer, the term of this patent is extended or adjusted under 35 U.S.C. 154(b) by 634 days.

(21) Appl. No.: 12/526,803

(22) PCT Filed: Jan. 31, 2008

(86) PCT No.: PCT/EP2008/000787
§ 371 (c)(1),
(2), (4) Date: Sep. 30, 2009

(87) PCT Pub. No.: WO2008/098684
PCT Pub. Date: Aug. 21, 2008

(65) Prior Publication Data
US 2010/0115690 A1    May 13, 2010

(30) Foreign Application Priority Data
Feb. 15, 2007   (EP) .................................. 07 003 210

(51) Int. Cl.
*E03D 1/00*    (2006.01)
(52) U.S. Cl.
USPC ................. 4/321; 4/233; 4/234; 4/241; 4/237
(58) Field of Classification Search
USPC .............................. 4/233, 234, 241, 321, 237
See application file for complete search history.

(56) References Cited

U.S. PATENT DOCUMENTS

| 1,097,768 | A | * | 5/1914 | Roberge | 4/241 |
| 4,951,328 | A | * | 8/1990 | Potvin | 4/560.1 |
| 5,031,249 | A | * | 7/1991 | Sargent | 4/321 |
| 5,318,275 | A | * | 6/1994 | Sargent et al. | 251/229 |
| 6,189,161 | B1 | * | 2/2001 | Rijn et al. | 4/321 |
| 6,212,700 | B1 | * | 4/2001 | Giesler et al. | 4/420 |
| 2006/0191065 | A1 | * | 8/2006 | Martinez et al. | 4/329 |

FOREIGN PATENT DOCUMENTS

| EP | 0404537 A1 | 12/1990 |
| WO | 2005053490 A2 | 6/2005 |

OTHER PUBLICATIONS

International Search Report dated Apr. 16, 2008.

* cited by examiner

*Primary Examiner* — Jason J Boeckmann
*Assistant Examiner* — Joel Zhou
(74) *Attorney, Agent, or Firm* — Pearne & Gordon LLP

(57) ABSTRACT

The invention relates to a toilet system (1) for installation in a vehicle, wherein the toilet system comprises the following components indicated: namely a base (2) which is to be fixed to the vehicle and has a top wall portion, also a toilet bowl (3) which is borne by the top wall portion of the base and has a top peripheral portion preferably bearing a toilet-seat ring (6), further a sewage-retention tank (15) which, in the use position, is arranged, at least in part, beneath the top wall portion, and additionally a guiding, retaining and coupling device which is configured such that the user—preferably from the outside of the vehicle—can pull the correspondingly formed sewage-retention tank out of its use position, in which it can be connected in a liquid-tight manner to the outflow of the toilet bowl (3), remove it from the vehicle and then replace it in said use position, wherein the toilet system (1) is configured such that, even after the base has been fixed to the vehicle, it is possible to make a selection between different intended positions in which the user can sit on the toilet bowl (3) of the toilet system (1), wherein the toilet bowl (3) is fixed to the base (2) in a predetermined position relative to the base, and at least the top peripheral portion of the toilet bowl (3) is essentially round and the toilet-seat ring (6) can be secured on the toilet bowl (3) in different positions, in which it has been rotated at different angles in relation to the vertical axis of the top peripheral portion.

18 Claims, 13 Drawing Sheets

Figure 1:
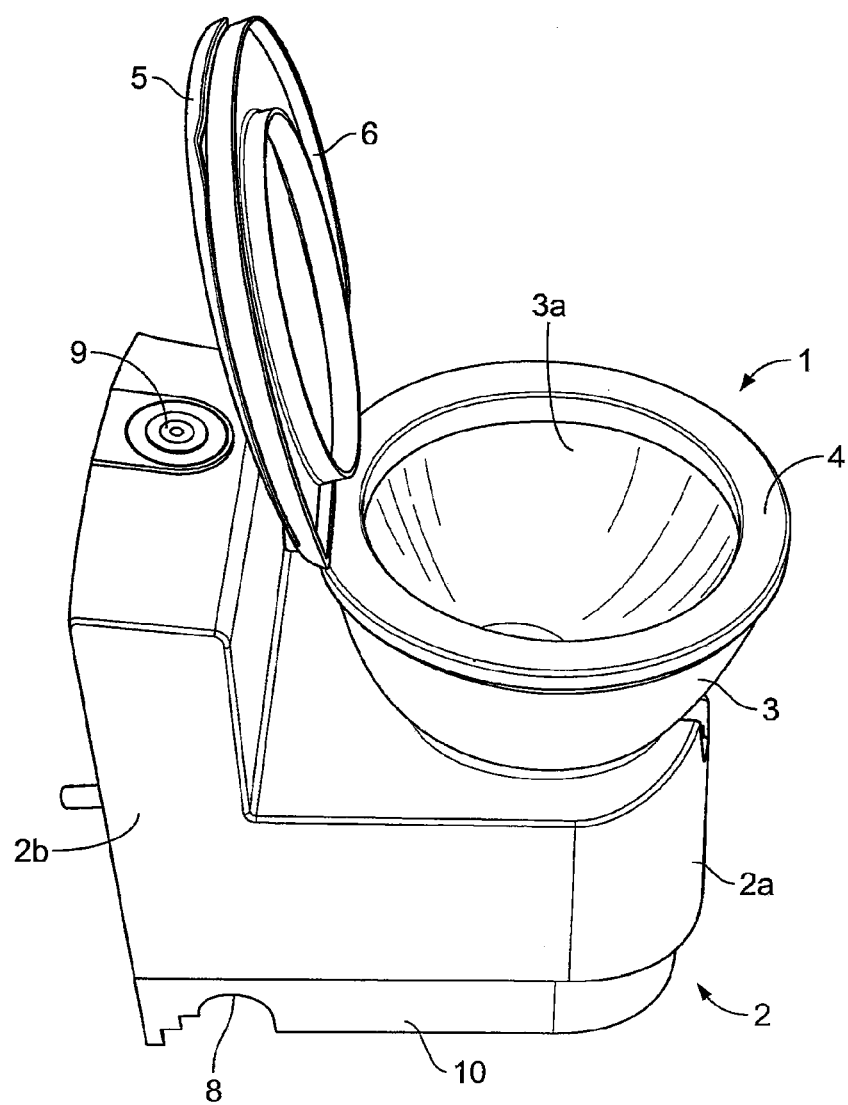

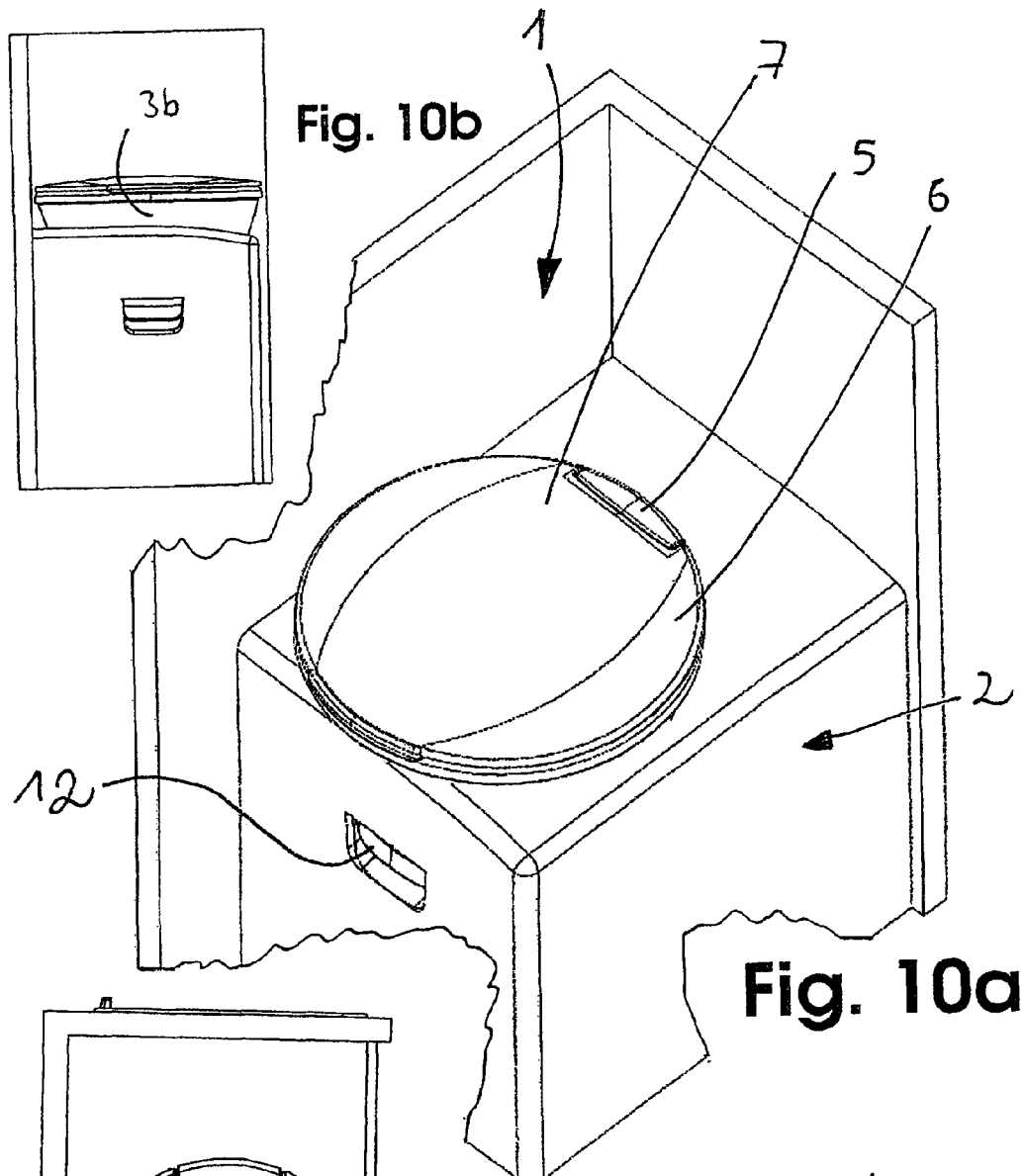
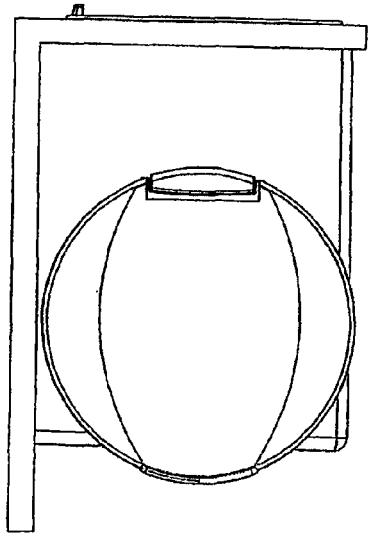
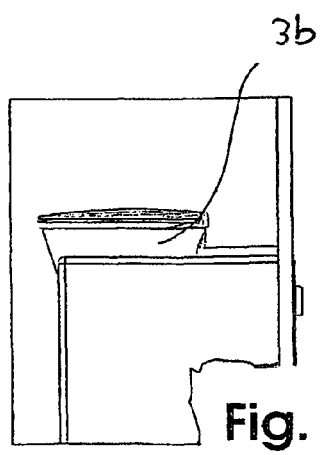
Fig. 10b
Fig. 10a
Fig. 10c
Fig. 10d

SPACE-SAVING TOILET SYSTEM

The invention concerns a toilet system to be fitted in vehicles according to the generic part of claim 1 as well as a vehicle fitted with such a toilet system according to the generic part of claim 16 and a corresponding application.

The term "vehicle" is used here in a broad sense and comprises also railbound vehicles, aircrafts and watercrafts, even if the invention is mostly of significance only for motor homes and caravans ("camping vehicles").

It is exactly in the case of camping vehicles where the optimum use of the available space is of importance. The wet area, that is increasingly becoming the standard fitting of such vehicles, has to be kept as small as possible despite all functions required from it. The wet area is, after all, used only for a few minutes each day, its size, however, limits the living area used for most of the time.

Furthermore, it is considered a standard nowadays, that the faecal tank, allocated to the toilet and forming a sub-assembly with it (so that to avoid an additional faecal pump) is provided in a separate storage compartment. The storage compartment is accessible from the outside via a service flap provided in the wall of the vehicle. The faecal tank can be removed in this manner and brought, independently from the vehicle, to the disposal stations for chemical toilets that are nowadays widely used, and emptied there.

This presents problems for the designer of the superstructure of the vehicle. After all, the quite bulky sewage tank can be, as a rule, sensibly arranged only in a few positions on the vehicle. One of the reasons is that, as a rule, one has to take the wheel guard of the undercarriage of the trailer or of the light transport vehicle acting as undercarriage, into consideration. A number of other, technically feasible mounting positions cannot be considered, as the toilet or the wet area cannot protrude into "the centre of the living area". Additional problems may arise when the designer of the vehicle would like to depart from the guideline, namely to provide, instead of the seemingly boring rectangular standard shape, triangular or obliquely extending wet areas. This is because in the case of conventional toilet systems, where currently the installed position of the sewage tank is determined (namely parallel or at right angle to the longitudinal axis of the vehicle) the position of the user sitting on the toilet is simultaneously determined, namely also parallel or at right angles to the longitudinal axis of the vehicle. It becomes clear, that due to this the design possibilities for the small wet areas become strongly restricted. In this conjunction reference is made, purely in the way of an example, to the toilet system known from the published patent application EP 0 248 511 A1.

To provide a remedy, the application EP 0 404 537 A1 and the patent granted for it in a slightly modified form, suggests a toilet system comprising a so called base section that accommodates the sewage tank and carries the toilet bowl named in this case as "pan section" in such a manner, that the toilet bowl can be flushed into the sewage tank situated below. The basic idea of the toilet system suggested in this case is that the connecting socket between the toilet bowl and the sewage tank has a movable seal and thus the complete toilet bowl can be rotated relative the base section. EP 0 404 537 teaches that the toilet bowl rotates within the limits determined by the vehicle's or its superstructure's manufacturer relative the base section and the sewage tank and is then secured on the base section. Thus the toilet system can be so set to a position by the manufacturer that the toilet can be also used in a position that is oblique relative to the direction of insertion of the sewage tank. This provides the manufacturer of the vehicle or the of superstructure with a considerably greater freedom of design with regard to the floor plan of the wet area. This solution is a practical one, since the shape of the toilet bowl is made to suit the human anatomy, the bowl being markedly narrower to the left and right than at the front and the back; by rotating the entire toilet bowl an anatomically correct sitting will be always ensured. Moreover, the rotation of the entire toilet bowl ensures an efficient removal of the solid faeces. This is due to the fact that due to the rotation of the entire toilet bowl the flushing nozzle with its jet always sweeps on the shortest path over exactly that rear region of the toilet bowl that has to be most urgently cleaned. Due to the limited tank capacity of leisure vehicles this is of considerable significance.

This solution, to let the toilet bowl with its flange rotate in the tank opening, has some very serious inherent disadvantages.

The seal between the sewage tank and the toilet bowl, even in the case of non-rotating toilet bowls, is a problematic area. This is because the seal has to remain permanently functional and reliably function even after multiple connection and disconnection of the sewage tank although it is subjected to strong soiling by faeces and soggy toilet paper. If one considers the requirement that the seal should withstand even one rotation, additional sources of errors will arise. This is because seals, which permit rotation, must inevitably allow only limited friction against the component to be rotated, and consequently have to make do with a lesser sealing pressure than static seals.

Especially according to the actually suggested solution in EP 0 404 537 arises the additional problem that the flange of the toilet bowl, that in this case is only poorly supported against the base section, communicates with the sewage tank via the bottom opening of the toilet bowl, will be subject to further load by the weight of the toilet's user. This is the case in particular when the person sits on the toilet, made from flexible plastic material, at an angle in the confined wet area that is often used also for storage (e.g. for wet surfing, diving and ski suits, beach towels or motorcycle riding suits) or even uses it during travel, something that often occurs in practice. It requires quite some manufacturing and material costs to achieve a displaceable partition joint between the toilet bowl and the base section that is fully in the line of the force flow and is so rigid that malfunctioning will be basically out of question. Just to mention it in passing, this is a particular problem when using toilet bowls with ceramic inserts, whereby in the region mentioned the additional problem, namely the permanent sealing of the ceramic insert against the plastic supporting section of the bowl, arises.

EP 0 404 537 mentions everywhere exclusively that the toilet bowl has to be rotated and firmly fixed in the required position by the vehicle's or the superstructure's manufacturer, so that the user of the toilet system can use it effectively only in one single defined position, i.e. in the intended, ergonomically correct position, for which the configuration of the toilet bowl and its seat are originally designed. Even if the person skilled in the art would be prompted by this publication to provide the decision of rotatability to the user, not much would be achieved by this; the solution suggested in EP 0 404 537, whereby after rotation the toilet bowl is to be bolted using a collet-like flange to fix the toilet bowl, is hardly suitable for regular adjustments by the user. Quite apart from the fact that such a regular displacement by the user would considerably intensify the problem of sealing.

Finally, the solution suggested by EP 0 404 437 has the inherent disadvantage that it can be rotated only about the centreline of the outlet of the toilet bowl. Therefore the positioning of the outlet and consequently the design of the toilet bowl always has to be considered with regard to the required rotatability.

A further disadvantage is that the supply of the flushing water to the toilet bowl cannot be carried out via a rattle-free and pre-installed, therefore correspondingly reliable pipeline between the base section and the toilet bowl. Instead of that, in every case a slack hose is required between the base and the toilet bowl; or the pipeline for the flushing water can be installed by the manufacturer of the vehicle or of the superstructure only after the final fixing of the toilet bowl. The latter runs contrary to the "plug and play" requirement of the manufacturer, that is geared to installed units with few handles.

The object of the invention is to considerably avoid the disadvantages mentioned.

The invention is based on the recognition, that the disadvantages stated are essentially inherent due to the basic principle of the known toilet systems with its rotatable bowl and consequently one has to move away from this principle. Therefore the invention provides, that the toilet bowl (i.e. the component comprising the toilet pan and its support structure, provided they are not integral) in a position that is predetermined relative the base is firmly joined with the base, namely firmly in that sense that it does not have to be rotated relative the base to alter the optimum sitting position of the user on the toilet, and that at least the top edge section of the toilet bowl is essentially round and the seat can be brought relative the toilet bowl into various rotated positions about the vertical axis of the top edge section of the toilet bowl and preferably can be secured on the toilet bowl in these positions, while the term of securing does not apply to the upward and downward pivoting of the seat. In short, the basic approach of the invention is to provide rotatability of the seat relative the toilet bowl.

Alternatively, or in addition, to the rotatability of the seat it is provided that the seat is essentially round. In this case essentially means that particularly in that region where the seat is not hinged, deviations from the roundness are not a problem; the basic idea is that the seat is round in such a manner that it enables sitting positions between the 4 o'clock and 8 o'clock positions without the user feeling in this range that the seat presses him and he sits "incorrectly". Differently from the known seats, which take the shape of the body into consideration and predetermine a preferred position, the seat does not determine a preferred sitting position within a wide range. Instead of that it enables the user to sit on the toilet without perceivable differences as far as sitting comfort is concerned in positions which are rotated relative the vertical axis of the top edge section.

This enables not only "low budget" solutions, that save even "the last bit" of the expenses and make do without an optimum adjusting mechanism for the seat, but also solutions that are explicitly practical because the user does not have to adjust first the position of the seat to quickly sit "obliquely" on the toilet, thus "avoiding" the ski suit or the surfing suit hanging to be dried in front of the toilet. When one considers this in practice frequently occurring situation, one recognises that in the spirit of the invention the use of a round seat for a toilet system in a camping vehicle is extremely practical.

Generally under the term "top edge section" the narrow, preferably approx. 3-10 cm high region, present as such also in the above stated state-of-the-art, is understood, that surrounds the opening of the bowl pointing towards the user and determines the largest external diameter of the bowl. At the same time the top edge section cannot, of course, stand out from the rest of the toilet bowl but can smoothly merge into that.

Ideally not only the top edge section, but the entire toilet bowl or at least its external contour are round, for example have the shape of a truncated cone.

In this respect the decisive feature of the invention is natural function; in the case of the known bowls, with oval or elliptic top opening without exception, the correspondingly constructed toilet seat can be sensibly mounted only in one position since in other positions the seat cannot be sensibly and usefully cover the opening of the bowl situated below it. This is eliminated by the invention by the round design of the top edge section.

For the sake of completeness it needs to be stated, that the top edge section has to be round only basically, i.e. small deviations from the round shape that do not impair the function strived for, are possible. Thus, to provide a concrete example, the top edge section can be readily constructed as a rectangular polygon, approximating the circular shape.

In all cases the decisive advantage of the invention is that the toilet bowl, even when it is a component separate from the base, can be firmly joined with the base by installing between it and the base bolted to it an appropriately strongly compressed seal or the bowl is even welded together with or adhered to the base. Consequently the weak point of the hitherto suggested construction, namely the partition joint between the toilet bowl and the base, designed for rotatability and situated fully in the line of the force, is eliminated. The number of joints, into which faeces can penetrate (even if it cannot escape to the outside), is reduced. At the same time in a simple manner a stable joint between the base and the toilet pan can be produced. The pipeline, supplying the toilet bowl with flushing water, can be pre-installed by the manufacturer of the toilet. The manufacturer of the vehicle or of the superstructure only has to connect the flushing water supply in a central position on the base.

Because the top edge section of the toilet bowl (in contrast to the flange connecting the toilet bowl to the sewage tank) is not subjected to any considerable bending and/or tilting moment, the mechanism provided there for the variable fastening of the seat can be produced as a simple, but functionally reliable, plastic part.

An advantageous development of the invention provides that the top edge section of the toilet bowl is overlapped in various rotated positions by a cover ring that can be installed and locked preferably without any tools. This cover ring supports on one side a mounting section, on which the seat and preferably also a lid covering the opening of the seat is hinged in an upward and downward pivotable manner. Without any tools in this case does not mean that the use of any simple auxiliary means has to be disregarded, but eliminates service work that can usually be carried out only by using spanners, appropriate know-how and requires time.

The cover ring with its mounting section allows a hygienically flawless fastening of the seat, and possibly also of the lid, in various rotated positions. This differs from a household toilet as in the case of such construction no longer are various holes, susceptible to dirt, required, in which the seat, according to requirement, can be mounted by means of appropriate pins being screwed in from below. Instead of this the seat, and possibly also the lid, are always fastened on the cover ring in the same position by means of a mounting section that is easy to keep clean. In turn the cover ring can be mounted flush on the top edge section of the toilet bowl, i.e. essentially without dirt-catching joints and possibly also sealed in the various rotated positions.

Another advantageous development provides that the cover ring is so constructed and held on the top edge section that it, together with the seat held on it, and possibly also the lid held on it, can be rotated by the user of the toilet to a position considered temporarily as comfortable by the individual user. When compared with previously known constructions, such a design has advantages. The user of the toilet can now himself determine, case by case, in which position he wants to sit on the toilet. This is particularly practical in camping vehicles, because the wet area is often used permanently or temporarily as a storage or drying space, for surf or diving suits for example, wet motorcycle riding suits, ski suits, beach towels or in individual cases also just as storage room for objects that have to be quickly put aside, from cases of beer to tennis racquets. As soon as the user of the toilet is capable to quickly determine the sitting position on the toilet with little manipulation, he is no longer is compelled to empty the wet area before he can use the toilet in a sensible sitting position. Instead of that he can "arrange" the objects stored in the wet area without any ado.

A further advantageous development provides that the cover ring moves on the top edge section in the manner of a rotatable sliding guide that is blocked by a locking mechanism. In this case the locking mechanism can be deactivated by the user of the toilet without any tools, so that to rotate the cover ring without removing it from the top edge section. In the case of this construction the cover ring typically does not slide on the total area of the edge section, but is guided, for example, on three positions distanced approx. 120° from one another. The locking mechanism typically comprises a locking lug fastened on the toilet bowl, said lug engaging a continuous serration provided on the inside of the cover ring and thus allows a markedly sensitive adjustment of the cover ring. A reversed design, of course, is also feasible, that in this case means that the toilet bowl carries the locking surface and the cover ring the lug.

In an advantageous manner the toilet system comprises a lid, that in the closed state essentially covers only the opening of the seat. In this case at least a substantial portion of the seat on the left and right is not overlapped by the lid, but remains free even in the case of a closed lid. Herewith the following explanation: depending on the position as to how the lid is placed on the toilet bowl, there will always be situations in which the lid cannot be pivoted upward far enough, but one of its side will prematurely come to rest on the obliquely extending wall of the wet area, and consequently will not remain in the fully opened position, but will repeatedly "fall on the back" of the user. This can be prevented by that the width of the lid is reduced parallel to its axis of pivoting, as it is suggested here. By doing so the lid is sensibly so designed, that along its entire external periphery it overlaps a certain portion of the seat and thus is supported over its entire external periphery by the seat. In this manner it will be prevented that at that moment, when the user of the toilet sits on the toilet to get dressed, the lid would be subjected to an excessive bending moment resulting in its breakage. Ideally the lid overlaps the seat on the left and right sides by 1.5-5 cm.

Preferably between the cover ring and the toilet pan a distributor ring, constructed in a normal case as a separate component and serving as a bearing surface for the cover ring, said distributor ring forming a channel system together with an inserted in it or integrated hole ring. A channel system, guiding the flushing water from a central flushing water storage along the top edge section of the toilet pan and introducing it into the toilet pan through corresponding orifices essentially around the top edge section, preferably through a gap between the cover ring overlapping the distributor ring and the toilet pan.

On the one hand such a design simplifies the manufacture of the toilet system according to the invention. A household toilet is usually integrally formed and in the top edge region of the bowl has a continuous frame-like section, to which flushing water is supplied via concealed channels that takes care of the partly even distribution of the flushing water, while in the case of household toilets due to the large volume of flushing water an even distribution of the flushing water is not of particular concern. In the case of the toilet system being discussed here, that is typically manufactured from plastic material or a composition of plastic material and ceramics, an integral moulding of the flushing water supply is uneconomical; the tooling expense and the number of mould slides required in the tool needs to be kept as low as possible. It is far more efficient to manufacture the distributor ring, guiding the flushing water, as a separate component and assemble it together with the cover ring on the toilet bowl. Namely in such a manner, that the cover ring, made from an easily cleanable and visually pleasing material, would cover the distributor ring. In turn, the latter can be made from another construction material that places less emphasis on the appearance and the cleaning of its surface.

On the other hand such a flushing water guidance ideally complements and improves the concept to enable the user to sit on the toilet bowl in various positions. Namely, differently from known systems, which flush the flushing water only locally or in certain areas, the flushing water guidance according to the invention ensures that solid faeces will always be adequately carried away irrespective of the position in which the toilet bowl is used and in which position the faeces impact on the toilet pan. An introduction of the flushing water into the toilet pan around the top edge section does not necessarily mean that the flushing water has to be actually introduced into the toilet pan at each position of the top edge section. It is quite feasible that certain areas, where, based on the dimensions by which the seat of this toilet system can be displaced, it can be assumed that no solid faeces will be deposited, can be omitted, if for no other reason than to save flushing water. For example, it may happen that flushing water is introduced into the toilet pan only in an arc of approx. 270° along the top edge section, and for example the front region, as a rule, of the toilet pan will not be directly flushed. At the end functional considerations are the determining ones. An introduction in a range of over 330° is ideal.

A further preferred configuration provides that the openings in the distributor ring are constructed as local holes which, by considering the nominal supply pressure of the flushing water, are so dimensioned and directed that the flushing water is sprayed curtain-like into the toilet pan from a plurality of single jets. At the same time the curtain essentially extends along the entire periphery of the top edge section. Namely in such a manner, that all surface areas of the bowl, on which solid faeces can be deposited when the toilet system is used as intended, will be swept over. In a sensible manner the openings of the hole ring and the supply capacity or the supply pressure of the flushing water pump are so harmonised, that in the optimum case the flushing water is sprayed into the toilet pan with a jet velocity of >1.2 m/s, even better >1.8 m/s.

At the same time in an ideal case the holes are so designed, that no permanent calcium deposits can form in them. This is because the holes are relatively small. This is necessary to enable to produce relatively fast jets by means of the holes, thus the jets having a good flushing effect even in the case of a small volume of water. Similarly to showers heads, there is the inherent risk that these relatively small holes may calcify. The problem is solved by that by virtue of the so called two-component injection moulding the holes are provided on that edge which borders their outlet opening with a bead from a soft-elastic material. This bead preferably protrudes into the interior of the distributor ring instead of standing out in the direction of the interior of the toilet pan. This bead, made from a soft-elastic material, becomes deformed under the influence of pressure surges occurring when actuating the flushing. Therefore the flushing blasts off possible calcium deposits, at least as soon as they reach a critical thickness. For reasons of hygiene it is sensible to let, as described, the bead protrude into the interior of the distributor ring, thus preventing as far as possible the depositing of dirt and bacteria.

To further round off the concept of the invention, the internal surface of the toilet pan that is subjected to faeces is to be so constructed, that it has in all places an adequate incline relative the outlet of the toilet bowl, thus forming a slope that lets the faeces slide off to the outlet latest during the flushing. Suitable slope angles relative the horizontal are preferably greater than approx. 30°, ideally greater than 40°. The actual suitable slope angle depends not least from the sliding properties of the wetted pan surface. As to which slope angle is suitable in individual cases, can be determined, for example, with the aid of the so called "sawdust test" and within narrower limits. By doing so first the entire surface of the toilet pan, that can be subjected to faeces, is wetted with water. Afterwards 20 g sawdust of average grain size is sprinkled evenly over the said surface of the pan. The test (to be carried out five times) is considered to be passed, when after each flushing process the pan's surface, not completely flushed free of sawdust, is less than 50 cm$^2$. The passing of the test signals that "the slope angle in this case is in the useable range", whereas where residues remain the slope angle has to be increased.

For this reason apart from the hygienic properties the sliding properties, and consequently the reliable removal of solids faeces with the specified slope angle can be improved, when at least that area of the toilet pan which, as intended, comes into contact with the faeces, is made from sanitary ceramics. Therefore the use of a ceramic pan advances the actual invention, since due to the various sitting positions on the toilet bowl it is particularly important that the toilet pan is reliably flushed clean in all areas.

A further improvement can be achieved when at least that section of the toilet pan which, as intended, becomes into contact with the faeces, is fitted with a hygiene coating, preferably a dirt-repellent coating, anti-adhesive coating or a dirt-repellent nano-coating. In the latter case the "lotus leaf effect", so called in the vernacular, occurs, so that all water-soluble substances drip off and slide off instead of covering the surface. Especially when using a dirt-repellent or anti-adhesive coating and in particular a nano-coating does a symbiotic effect occur in conjunction with the primary inventive steps. Namely such a coating or layer promotes the complete and clean flushing of the toilet pan, as a matter of fact even when only little water is available for this and toilet pan is used in various sitting positions (4, 6, 8 o'clock, etc.), therefore it does not make any sense to direct particularly strong jets of flushing water to a few places.

On this occasion nano-coatings meant are not those which are subsequently sprayed or rubbed on like household cleaners, but as commercially available coatings or layers, which during the manufacture of the toilet bowl firmly and permanently are bonded with its surface, because nano particles interlock with the surface roughnesses of the support material and penetrate, so to say, the outermost layers of the support material or even become incorporated into it. A suitable nano-coating is offered, for example, by the company Stamberger Beschichtungen GmbH, 82303, Stamberg, Germany, under the brand name "Nanofinish"; one deals here with a contour-following and subsurface migration-stable thin coating of the plasma technology with anti-adhesive properties. Alternatively the nano-coating offered, for example, by the company Hillebrandt Coating Technologies, Westerhaar 60, 58739 Wickede/Ruhr, Germany, marketed under the brand name NFC, can be used. Provided the toilet bowls are made from plastic material, plastic blends may also be used, which have an appropriate contents of nano particles to achieve the desired surface characters and thus an appropriate coating (at least) on the surface.

In passing it should be mentioned, that independently from the invention claimed, it has proved itself particularly advantageous to also coat the internal surface of the sewage tank with such a nano-coating. This facilitates the hygienically impeccable cleaning of the tank that needs to be done regularly for most vehicles, to make the vehicle ready for winter; essentially to save the user from scraping off the faecal encrustations accumulated during the year from places that are difficult to access and are situated inside or first to tediously dry the tank so that to prevent the formation of gases caused by the encrustation. Instead of that all he has to do is to flush out the inside of the tank with a water hose. Especially in the case of the sewage tank is it recommended to internally coat it not subsequently, but to manufacture the tank from a plastic blend filled with nano particles, as it is offered, for example, by the company Süd Chemie AG, Lenbachplatz 6, 80333, München, Germany, in cooperation with the company Putsch Kunststoffe, Wiesbadener Str. 13D, 90427 Nürnberg, Germany.

According to a further advantageous embodiment the plug to open and close the tank, actuated during the flushing of the toilet, together with the actuating organ operated by the user, is fastened exclusively on the sewage tank. To enable, despite this, an actuation of the inserted tank, the base has a wall (preferably it is the front wall) harmonised with the sewage tank, that has an actuating opening. A soon as the sewage tank is in the operating position, the handle on the sewage tank to actuate the plug appears in this actuating opening and can be actuated from the wet area. Such a construction is considerably simpler than the solution hitherto suggested by the state-of-the-art. The latter namely suggests that the base carries a separate actuating organ for opening and closing the plug, that is coupled to the actuating organ when the sewage tank is pushed in and is uncoupled when it is pulled out. This requires not only additional components, but above all such components which have to transfer not inconsiderable forces and consequently have to be accordingly dimensioned so that not to suffer fatigue.

A further improvement is when in the region of the actuating opening a pivotable flap is provided, that is pushed upward during the insertion of the sewage tank, then is held by the sewage tank in its open position outside of the actuating opening and after the removal of the sewage tank pivots back into the actuating opening and closes this off, preferably airtight. Such a closing is sensible not only from the point of view of visual aesthetics. By this a significant air exchange between the wet area and the compartment to accommodate the tank situated behind the actuating opening when the tank is removed, will be prevented. In this manner the penetration of possible smells, caused by toilet sprays, and of relatively cold air to the wet area from the area accommodating the tank would be essentially prevented. In reverse, it will be prevented that, for example, during showering saturated moist air from the wet area would penetrate into the colder area intended for the tank and precipitate there or even water reaching the compartment.

Ideally a signal is emitted by the flap, indicating that the toilet cannot be operated due to the removed tank. The kind of signal to be used is not limited. One can imagine a contact actuated by the flap, the contact producing an electric warning signal and/or switches off the flushing water pump and/or (directly mechanically or by means of an electric actuator) locks the toilet lid, representing a first class solution. However, for cost-effective solutions it is sufficient to execute the flap in a conspicuous colour and thus visually indicate to the user that temporarily no tank is installed.

Additionally or alternatively a direct request to the tank may be provided, i.e. as soon as the tank is removed this is signalled by a suitable actuator, directly responding to the tank, that again triggers some sort of a cautionary step described above.

A further improvement of the toilet system according to the invention is when the diameter or the external contour of the toilet bowl 3 (more accurately of the toilet bowl housing 3b) is so chosen, that the projection of the toilet bowl in the vertical direction from above essentially does not extend beyond the basic area of the base, in any case no more than 5 cm.

Such a configuration of the toilet bowl 3 results in a particularly good use of the space. It is because at least the length and the width of the base are essentially predetermined by the shape of the tank 15 that is accommodated in the service compartment formed by the hollow space of the base 2. Therefore it is finally the base 2 that determines the size of the minimum area required for the toilet system in the vehicle or in the wet area. A toilet system, the toilet bowl 3 of which (viewed from above) does not project laterally past the basic area required by the base 2, is therefore ideally a space-saving one.

It is exactly the concept, not to make the entire toilet bowl 3 rotatable, but to provide a bowl and a pan with at least a circular opening, on which the seat 6 (and possibly the associated lid 7) can rotate, that further advances such a configuration. It is because in that moment, when not the entire toilet bowl 3 is rotated about its outlet but only the seat 6 and the bowl 3, the bowl could be more freely designed than in the case of known toilet systems wherein by virtue of its rotatability the toilet bowl has to take into consideration the position of the outlet opening, determined by the position of the sewage tank.

Even if one could think so to design the toilet system known from the state-of-the-art that the bowl could be rotated not only by the vehicle's manufacturer but also by the user, the configuration of the invention suggested here has its advantages. To rotate, after its use, the toilet bowl projecting in the used position into the space past the base, to a space-saving position (for example to provide a better access to the shower situated adjacent to the toilet) it has to be grasped on every occasion, what could be considered as unpleasant.

Figure 2:
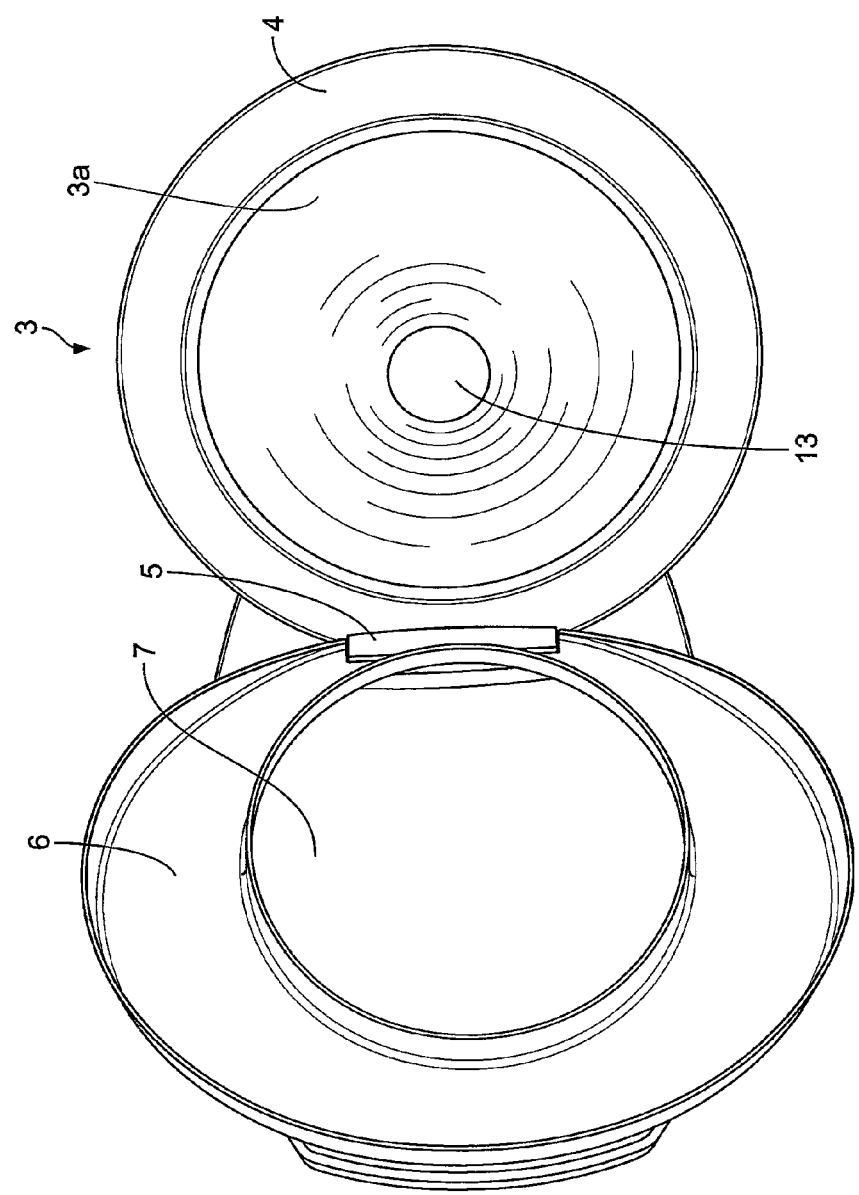
Figure 3A:
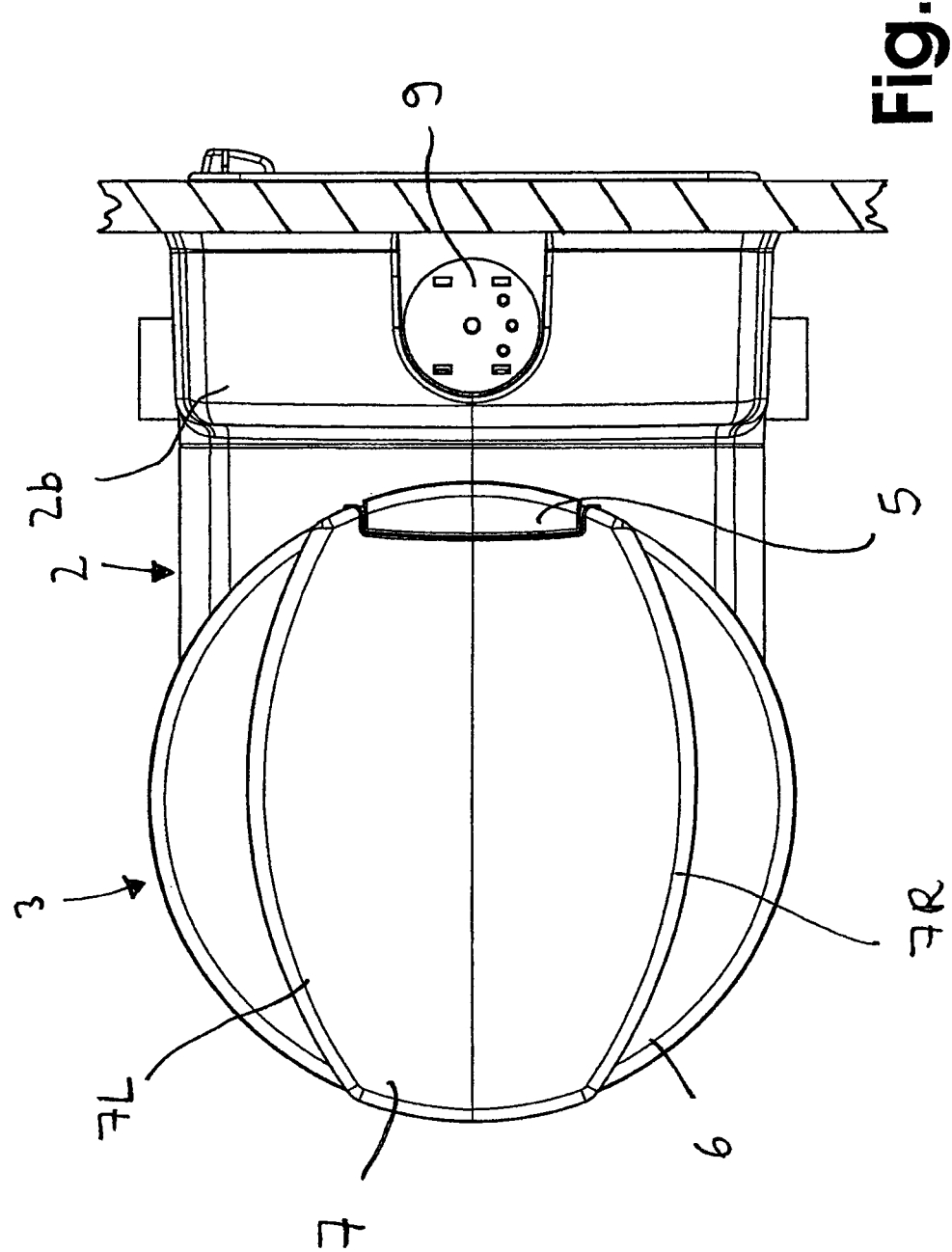
Figure 3B:
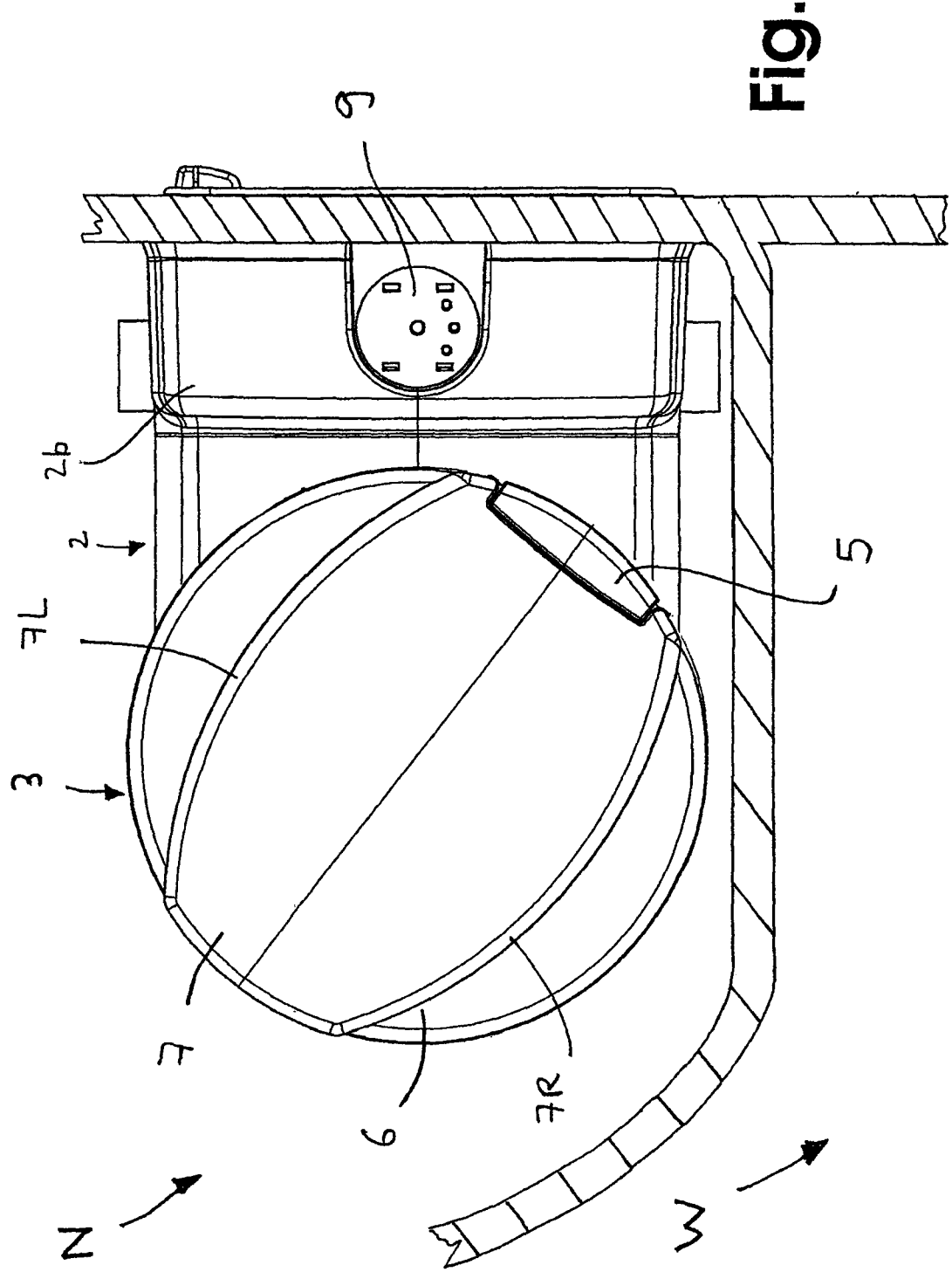
Figure 4:
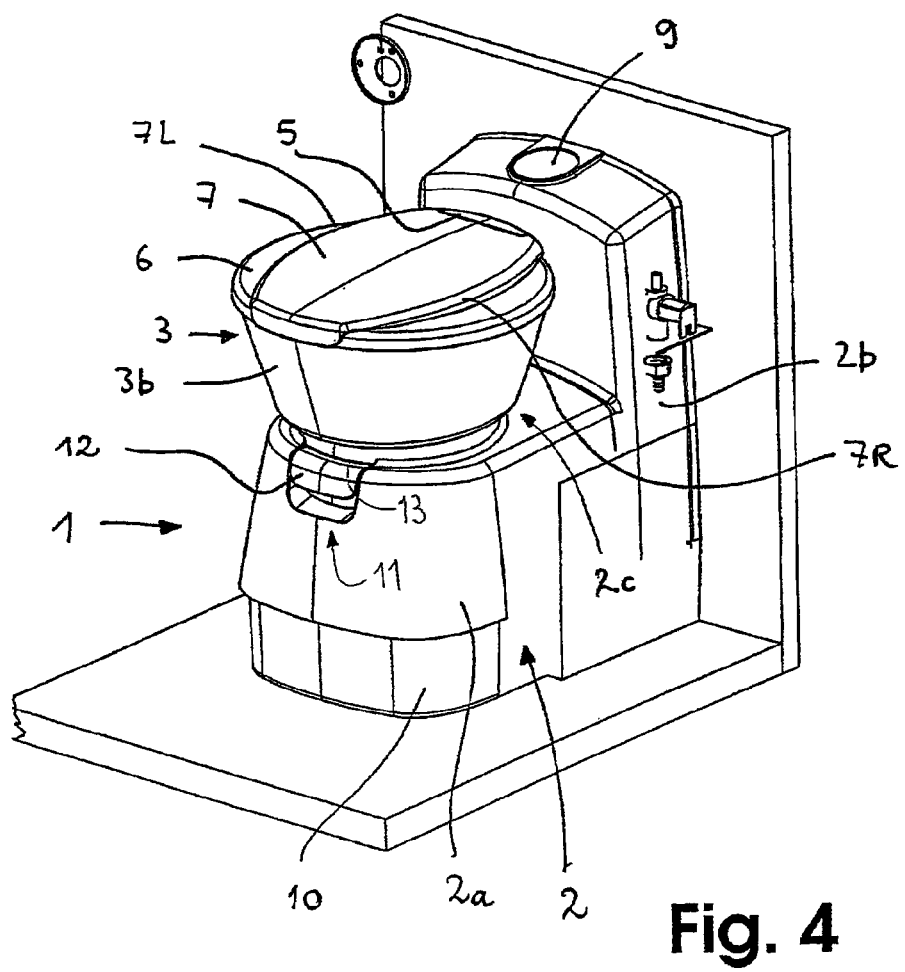
Figure 5:
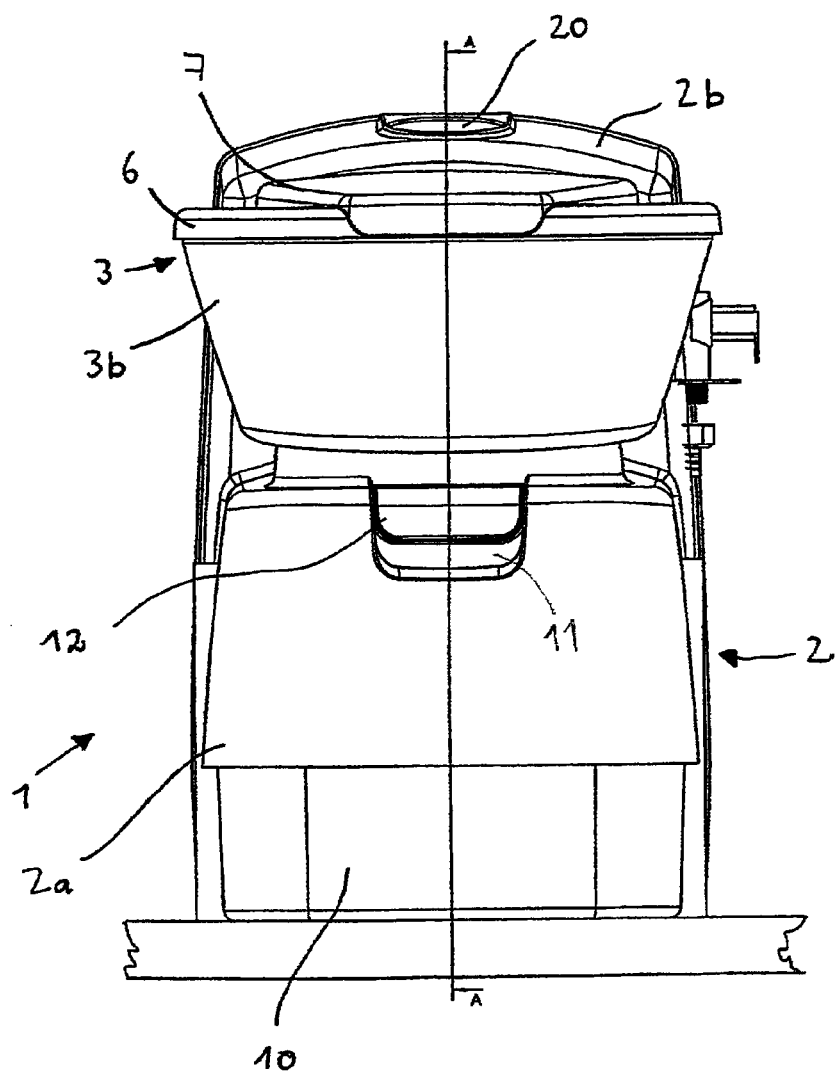
Figure 6:
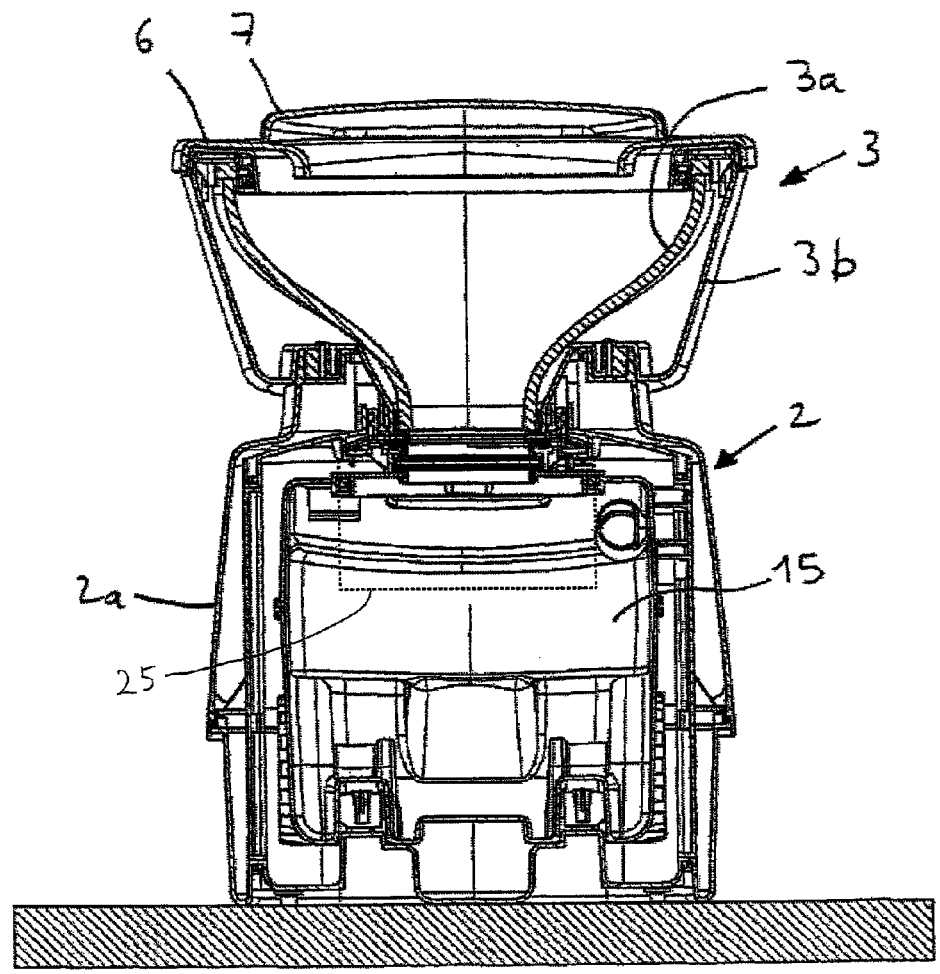
Figure 7:
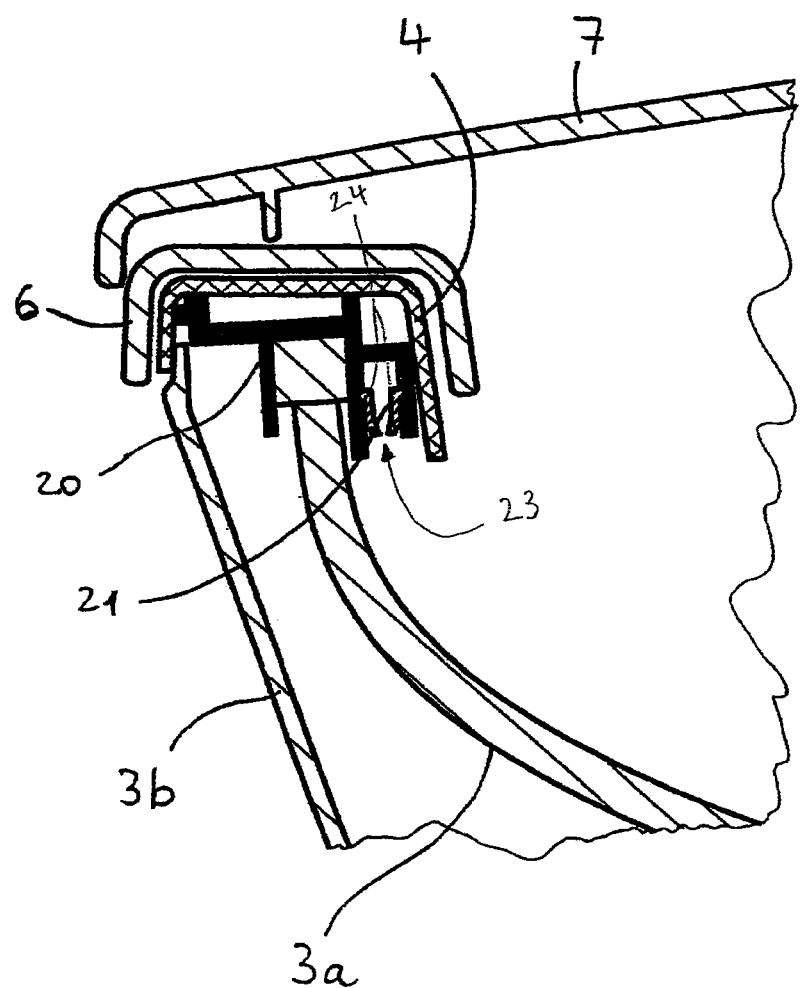
Figure 8A:
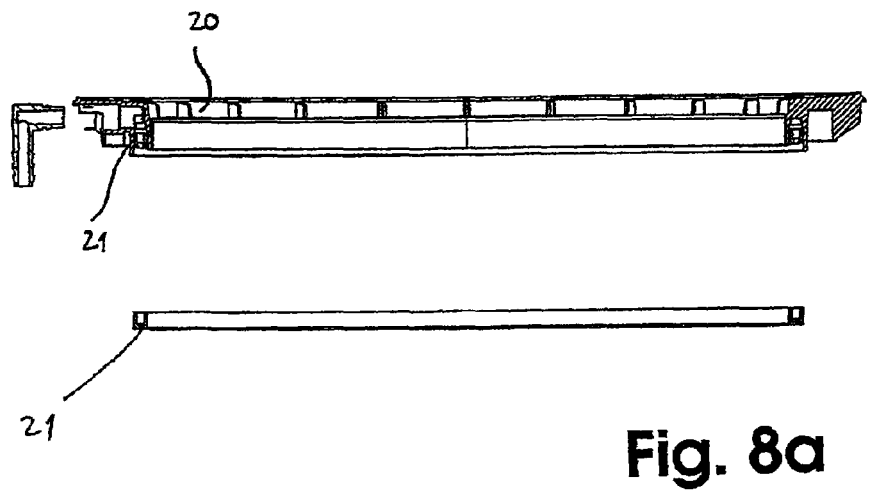
Figure 8B:
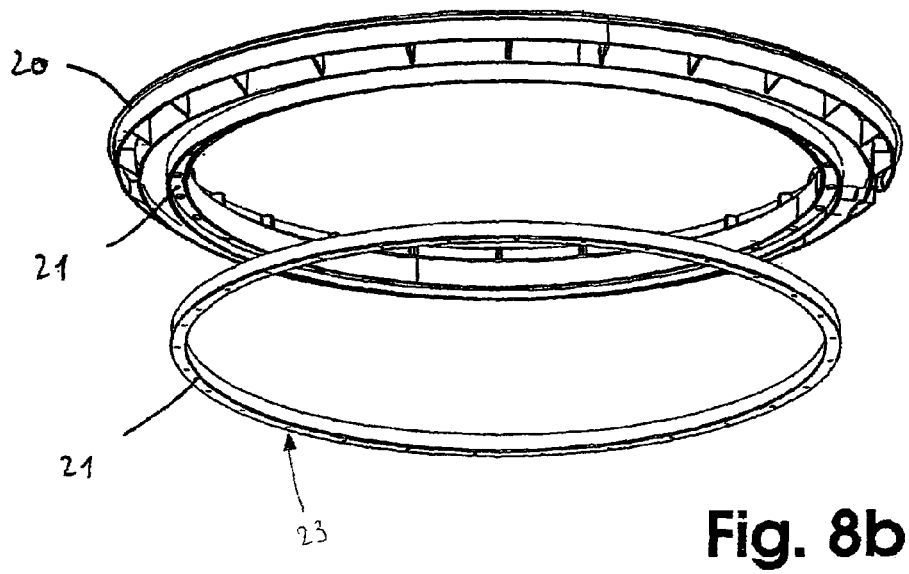
Figure 9:
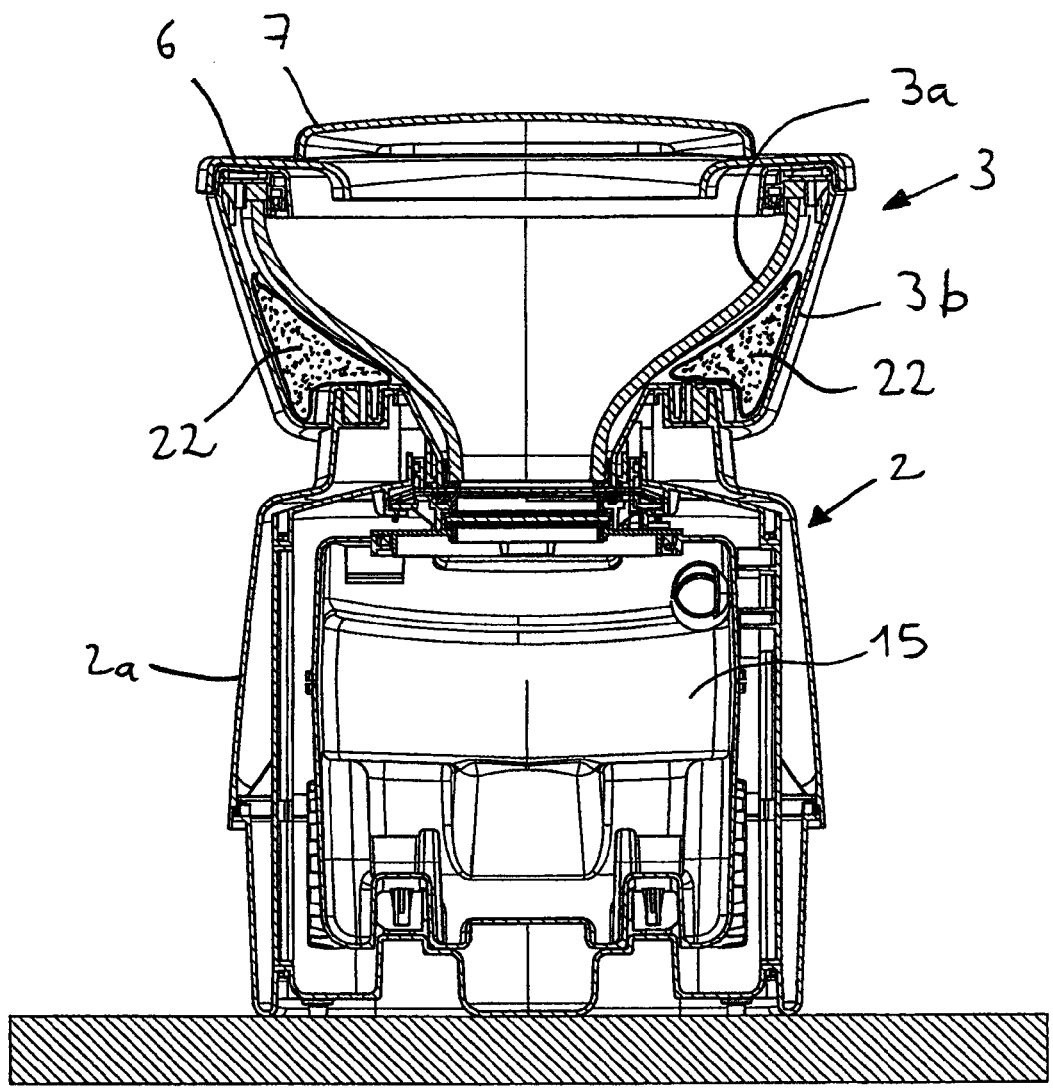
Figure 11A:
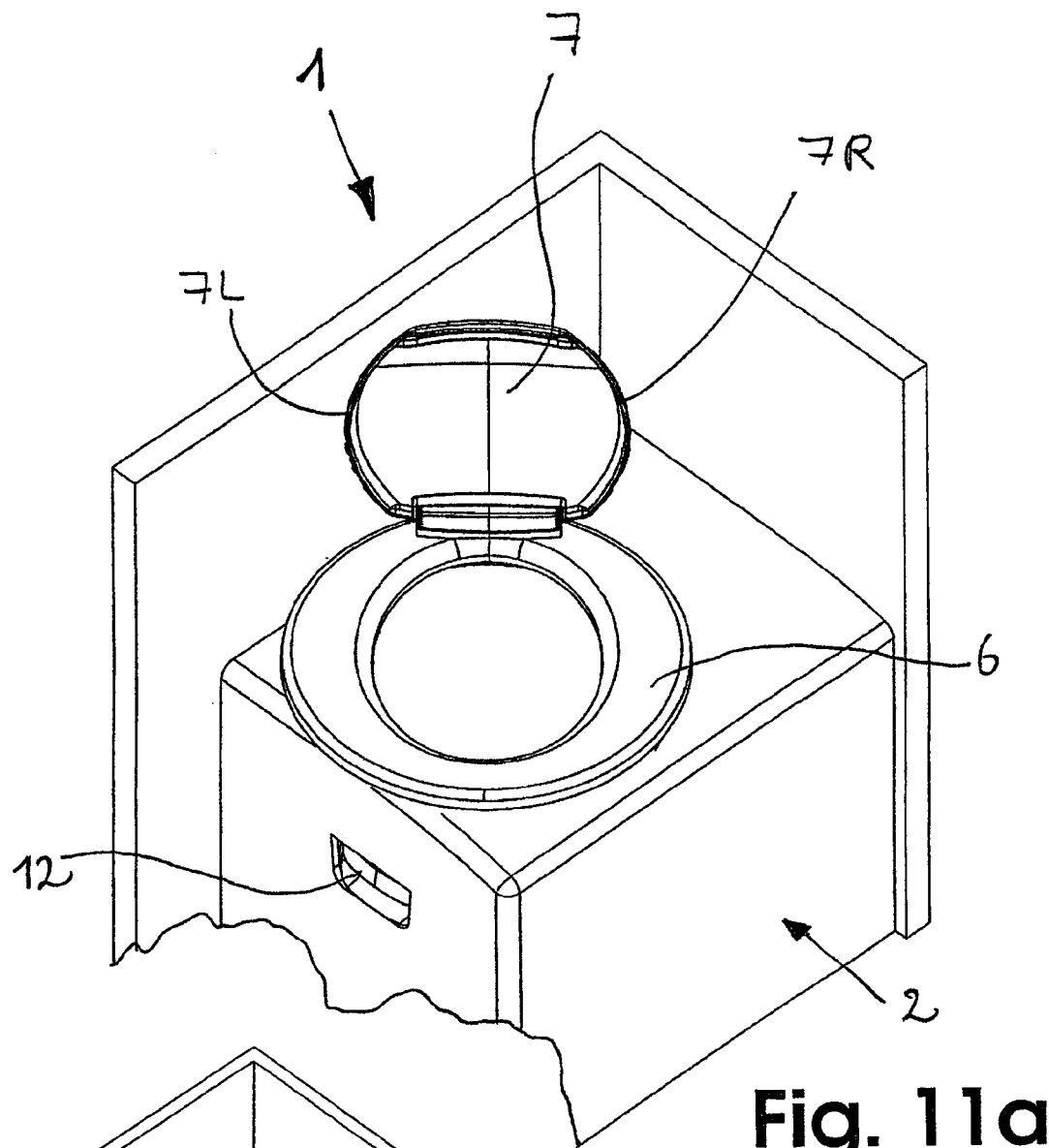
Figure 11B:
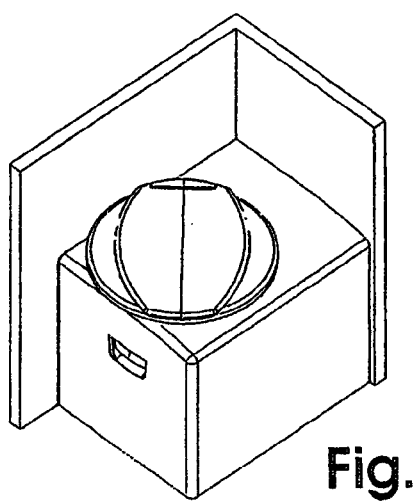
Figure 12A:
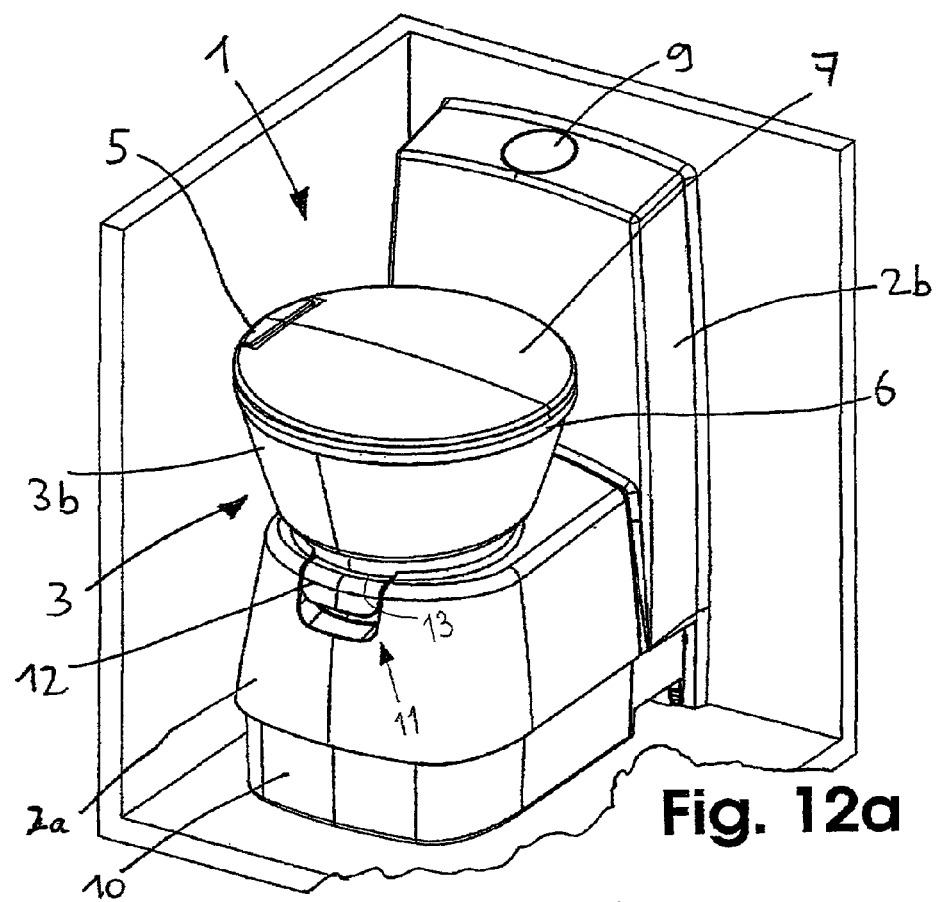
Figure 12B:
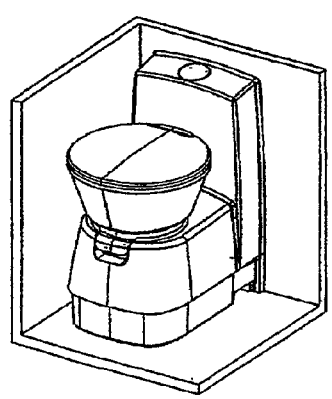
Figure 12C:
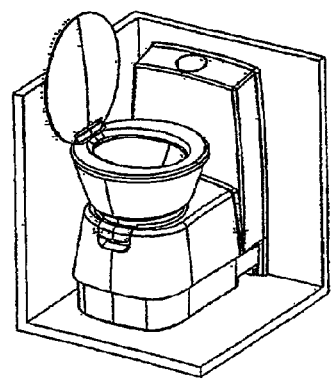

Further advantages and possibilities of configurations of the invention become apparent from the embodiment described in the following. They show in:

FIG. 1—a lateral view of the embodiment according to the invention with the seat and lid opened, FIG. 2—a top view on the embodiment directly from above, with the seat and the lid pivoted to the open position, FIG. 3a—a top view on the embodiment according to the invention from above, with the seat and the lid in the closed position, in a first position of the seat and lid, FIG. 3b—a top view on the embodiment according to the invention from above, with the seat and lid in the closed position, in a second position of the seat and lid, that is so chosen that in this case the toilet system can be accommodated according to a space-saving design because the wet area can be rounded towards the centre of the living area, FIG. 4—another lateral view of the embodiment according to the invention with the seat and lid closed, FIG. 5—a front view on the embodiment according to the invention, and FIG. 6—an illustration of the embodiment according to the invention sectioned in the centre through the outlet of the toilet pan, FIG. 7—a detail of the left top edge region of the toilet bowl illustrated in FIG. 6, FIG. 8—FIGS. 8a and 8b are detailed drawings of the components shown in FIG. 7, namely the distributor ring with the hole ring inserted and additionally the hole ring on its own, FIG. 9—a modified embodiment with a special storage tank for flushing water and added sanitising agent in an illustration according to FIG. 6, FIG. 10—FIGS. 10a-10d show a second embodiment of the invention in the form of a so called "bench solution", namely FIG. 10a in perspective obliquely from above, 10b from the front (i.e. in the direction of the narrow side of the bench), FIG. 10c vertically from above, while FIG. 10d a lateral view from the wide side of the bench, FIG. 11—FIGS. 11a and 11b show further views of the embodiment already shown in FIG. 10, however with the seat rotated, FIG. 12—FIGS. 12a-12c show a third embodiment of the invention, namely once again in the form of a so called "stand alone" solution, but with round lid.

The toilet system 1 basically comprises two components, namely the base 2 and the toilet bowl 3. In turn the base is made up from a base section 2a forming the tank compartment, a base section 2b forming an installation cover and joined with it, and an upper well section 2c.

FIGS. 6, 7, 8a and 8b show the exact construction of the toilet system. The toilet bowl 3 is made up from various parts, namely, inter alia, the actual toilet pan 3a receiving the faeces, the bowl housing 3b, the cover ring 4 and the distributor ring 20, that in this case is fitted with a separate hole ring 21, cf. in particular FIG. 7. On one side the distributor ring 20 has a connection for the supply line coming from the flushing water pump. Together with the hole ring 21, that is accommodated by it, it forms a channel that is provided over 360° above the edge of the toilet pan 3a, i.e. it will be definitely flushed all around.

The distributor ring 20 is covered all around by the cover ring 4, that can be locked on the distributor ring 20 in various positions; as a rule the distributor ring 20 and the cover ring 4 are sealed relative one another, not illustrated here. The cover ring 4 is so constructed that between it and the toilet pan a region, open downwards, remains free, through which the flushing into the toilet pan 3a is carried out through the hole ring 21 of the distributor ring 20.

The actual toilet pan 3a is illustrated here as a cup-shaped insert made from sanitary ceramics, that is firmly held by the bowl housing 3b, namely in the lower region by a corresponding flange of the bowl housing 3b and of the base 2 (cf. FIG. 6) and in the upper region by means of the distributor ring 20 and of the cover ring 4, which are joined with the bowl housing 3b (cf. FIG. 7). At the same time the bowl housing 3b, just like almost all components with the exception of the toilet pan 3a, are made of plastic material. Within the scope of low-cost solutions the toilet pan 3a can be also made from plastic material, but in that case as a special measure the use of an anti-adhesion coating is advised.

In passing it is to be noted, that the intermediate space between the bowl housing 3b and the toilet bowl 3a, visible in FIG. 6, can be used to accomplish special solutions, for example in the premium comfort field or for expedition vehicles, wherein the saving of space is so important that expenses need not be considered. It is namely possible, as it is illustrated in FIG. 9, to build a hose tank or collapsible tank between the bowl housing 3b and the toilet bowl 3a that accommodates an additional storage for flushing water or chemicals. If required, the chemicals can be dosed (by an appropriate pumping equipment, for example) to treat the toilet bowl (deodorising) or to prevent putrefaction in the tank. In this case the hitherto used method, "pouring the toilet chemicals from the bottle (possibly through the toilet pan) into the tank", making some users to feel quite "awkward", can be omitted. There is, in particular, the possibility of automatic dosage, so that an adequate amount of chemicals will always reach the sewage tank, without being excessive.

The toilet bowl 3 and the base 2 are usually manufactured as separate components. They are, however, firmly joined with one another, namely they are so configured that they can be bolted or riveted together in a predetermined relative position at the workshop or welded together in this position (cf. FIG. 6). The latter ensures a particularly durable and long-lasting reliable joint. Instead of bolting together a corresponding locking of the components with one another is, of course, also feasible.

The base section 2a, forming the tank space, and the base section 2b, forming an installation cover, are usually also manufactured as separate parts and assembled afterwards.

As there are no particular requirements regarding sealing between these parts, for the purpose of assembly of these components, as a rule, locking is used, as is in this embodiment.

On the base 2 one can recognise the continuous floor tub flange 10. The bottom tub flange usually corresponds with a correspondingly shaped collar, that is situated in the plastic floor tub sealed at the floor of the wet area that, as a rule, also functions as the shower base. The toilet system is then inserted from above into this collar.

In the rear region of the floor tub flange 10 the installation outlet 8 can be recognised, the purpose of which, inter alia, is to let a hot air line, extending in or opposite the direction of travel, into the toilet system and to guide a flushing water supply pipeline from the fresh water tank as well as the necessary electric cables behind the base section 2b that forms the installation cover.

The operating principle according to the invention can be best explained based on a simultaneous examination of FIGS. 2, 3a and 3b and 7.

In the case of the embodiment according to the invention, the external contour of the toilet bowl 3 is that of a circular truncated cone that tapers downwards to the base 2, cf. also FIG. 5. Due to this configuration the toilet bowl 3 does not provide a preferred sitting position. Instead of that, when one considers that the base section 2b, forming the installation cover, represents the 12 o'clock position, the toilet bowl 3 can be used without any problem in the sitting positions corresponding to between 3 and 9 o'clock.

In the case of the simplest and most cost-effective embodiment of the invention (not shown in the drawing) the seat (possibly not even displaceable) is also circular, i.e. has a rotationally symmetrical design. By virtue of this it will be possible to occupy the aforementioned sitting positions without any perceivable discomfort and without changing the position of the seat. In this simplest case the user is subjected to some discomfort in the extreme sitting positions close to the 3 and 9 o'clock positions, as in these positions the upward swivelled lid is close to his left or right side and not at the back, as it is usual in toilets. Consequently the seat has to be circular, so that to enable a basically comfortable sitting position between the half past 3 and half past 8 positions.

Therefore, to further increase the comfort of the user, in the embodiment shown here the positions of the seat 6 and of the lid 7 can be changed. For this purpose a cover ring 4 is clipped on the top of the bowl housing 3b that, as it can be best seen in FIGS. 3a and 3b, carries a mounting section 5 on which the seat 6 and the lid 7 are pivotably fastened. Depending on the design of the clipping mechanism for the cover ring 4, the cover ring 4 can be locked at fine increments in almost any conceivable position between the 2 and 10 o'clock positions or, in the case of simple versions, only at preferred positions within this range, for example at 3, half past 4, 6, half past 7 and 9 o'clock positions. From the figures illustrated here FIG. 3a shows the case when the cover ring is so locked on the bowl housing 3b, that the lid and the seat are locked in the 6 o'clock position. In contrast to this, FIG. 3b shows the case when the seat 6 and the lid 7 are in the 8 o'clock position.

The advantage of such a construction, achieved by the feasibility of various positioning at least of the seat, is that the design of the seat is to suit the ergonomics of the toilet's user and can have relatively wide thigh supports left and right, as this can be seen in FIG. 2. What is decisive in this case is that a comfortable seat of this kind still includes a circular surface between its edges (or with its external edge), so that despite the asymmetric design for the thigh supports the seat can be still mounted on the top edge section of the toilet bowl in various rotated positions. At the same time the more or less perpendicularly downward angled external edge of the seat is circular and thus made to suit the circular external contour of the top edge section 3c[sic], that the external edge of the seat overlaps the top edge section and rests all around or at least at several positions on the top edge section. This configuration, that also deviates from the seats of conventional household toilets, prevents the mounting section 4 and the mounting axis, being subjected to an excessive bending moment. Namely, when the user slides back and forth on the seat and creates the tendency of pushing the seat in the horizontal direction to the left and right, or when the user, in the case of a rotation-locking mechanism for the seat, pulls the locked seat to rotate it.

In this embodiment the toilet lid 7 also has a specially adapted shape. Its unique design can be clearly recognised in FIGS. 3a and 3b. The lid 7 is not circular, but the circular shape is trimmed on its left side section 7L and on its right side section 7R. Consequently the lid is narrower than the seat. The advantage of this is that the lid can be fully swivelled upward in all relative positions it can assume relative the bowl housing 3b, in particular even in the half past 4 and half past 7 positions. These are those positions wherein a completely circular lid would prematurely strike against the wall of the vehicle or the rear base section 2b forming the installation cover. The result of this would be that it no longer could be pivoted upwards more than 90° and due to this would not remain in its upward pivoted position, but would permanently "fall on the back" of the toilet's user. Based on FIG. 3b, that shows the toilet system according to the invention designed and built into a rear wet area, it is easy to comprehend that the living area and/or the passage to the rear is rounded. In such an installed situation a completely circular lid would prematurely strike against the wall of the wet area and/or the base section 2b.

Based on FIGS. 3a and 3b it can be also recognised that the lid 7 overlaps the seat 6 (viewed from the front) on its left side section 7L and its right side section 7R to that extent, that in the closed state it is so supported by the seat that it will not be subjected to excessive bending loads under the weight of the user who may sit on it.

Not least from FIG. 5 it can be recognised, that measures can be carried out also on the lid 7 to prevent the lid transferring an undue great bending moment to the mounting section 4[sic] when the user sits on it and slides back and forth or attempts to rotate the closed lid; the lid is provided with a downward pointing lug that suits the contour of the seat, said lug supporting it against a displacement horizontally to the left or right on the seat.

A simultaneous viewing of FIGS. 1, 2 and 6 shows that the toilet pan 3a, that is intended to receive the faeces, has on all sides a relative steep incline relative to the almost central outlet of the toilet pan. In a manner different from the one shown here, the outlet can be provided completely centrally. This would ensure that an even optimum removal of the faeces would take place in all possible sitting positions. In the embodiment illustrated the outlet is, however, provided slightly off centre. In this manner the fact, that although in the case of such a toilet sitting positions are possible between the 3 o'clock and 9 o'clock positions without any problem, in most cases the sitting positions are between the 5 o'clock and 7 o'clock positions, has been taken into account. Accordingly, the toilet shown in this embodiment is optimised for these sitting positions.

FIG. 6 gives an insight into the technology that, as a rule, is concealed from the user (viewed from the wet area), that is accessible only from the service flap through the wall of the vehicle. FIG. 6 shows from the rear, therefore from the service flap, the base section 2b forming the installation cover, that blends into the base section 2a forming the tank space. The tank 15, that is pushed in in the direction of viewing and removed against the direction of viewing, is easily recognised. The tank has a discharge socket 16 that can rotate about a vertical axis as well as wheels (not illustrated) and a trolley handle 17. By virtue of its wheels and its handle, after its removal from the vehicle the full tank can be comfortably taken to the disposal station like a suitcase. Furthermore, one can see the electric cables, the flushing water pump 18 and the associated flushing water suction pipeline 19. The flushing water pump 18 is actuated by the user via the operating panel 20[sic], that can be seen also in the other figures.

FIG. 5 shows the toilet system 1 from the front. One can clearly see, that in the front wall of the base section 2a, forming the tank space, an actuating opening 11 is provided, into which the handle 12, firmly on the tank 15, to actuate the tank plug 13 protrudes. In the case of this embodiment the tank plug 13 operates as a guillotine-like slide; when the user of the toilet pulls the handle 12 from the plane of the drawing of FIG. 5, he opens the tank 15 and thus the outlet of the toilet pan 3a, through which the faeces can be discharged. When the handle 12 is pushed back in the direction of the plane of the drawing of FIG. 5, the tank 15 and thus the outlet of the toilet pan 3a will be closed.

Finally, reference is made to the embodiment according to FIG. 9. In this case in the intermediate space between the bowl housing 3b and the toilet pan a hose-like soft tank 22 is placed, the contents of which is shown by dots. In the present case this soft tank 22 can be filled with sanitising agents via a socket protruding outward in the region of the seat's hinge 5[sic], similarly to the windscreen wiper liquid container of a car, that is nowadays usually produced as a soft pouch, accommodated in a hollow space of the chassis and is accessible only via its neck-like filler socket protruding into the engine space. In the present case the tank has a capacity of approx. 5 L, but it can be greater or smaller depending on the design of the bowl housing 3b. An electrical pump (not illustrated) is provided for the additives, that by pushing a button provides a preset dose of sanitising agent, so that one does not have to handle the bottles containing the sanitising agents after each discharge of the faeces tank and the necessary amount does not have to be manually measured.

FIGS. 10 and 11 show a further embodiment of the invention, namely in the form of a so called "bench solution". Differently from the previously described embodiment, that is conceived as a "stand alone solution", in this case the toilet bowl 3 is integrated to a great extent in the base 2, extended into a box-like bench, so that essentially only the top edge section of the toilet 3 protrudes from the bench-like base. Such a bench solution is preferred by some users from the design point of view, but also for practical reasons; in most cases the area around the toilet is easier to clean than is the case for "stand alone solutions", as difficult to access sections between the toilet and the walls of the wet area are avoided in the case of the "bench solution". In addition, areas for resting articles in the rear section of the toilet are produced.

As it can be inferred from the diverse FIGS. 10 and 11, the fact that the seat 6 according to the invention can be positioned, provides advantages also for such a bench solution. At least the manufacturer of the vehicle can decide regarding the position of the seat 6. However, in an advantageous manner the user can also have a say in it by positioning the seat 6 together with the lid 7 according to his wish and so position the seat that the toilet can be used quickly in the 4 o'clock position, for example because in the corner of the wet area (in the 8 o'clock position) a clammy ski suit is hanging to be dried, that first need to be awkwardly removed from the wet area.

It becomes again obvious, particularly based on FIG. 11, how practical the lid 7 is that is narrower on the sides (7L, 7R) than the seat 6.

If it does not matter whether the lid 7 is particularly practical (because it can be pivoted unhindered almost in any position) or not, and the most important aspects are design and often the full cover of the seat 6, considered as hygienic, both the "stand alone solution" and the "bench solution" can be provided with a lid fully covering the seat, as this is illustrated in FIGS. 12 on a third embodiment in the form of a "stand alone solution", that is additionally fitted with a base section 2b, forming a larger installation cover.

LIST OF REFERENCE NUMERALS

1 Toilet system
2 Base
2a Base section forming the tank
2b Base section forming the installation cover
2c *Upper wall section*
3 Toilet bowl
3a Toilet pan
3b Toilet bowl housing
4 Cover ring
5 Mounting section
6 Seat
7 Lid
7L Left section
7R Right section 8 Installation outlet
9 Service panel
10 Floor tub flange
11 Actuating opening
12 Handle to actuate the tank plug
13 Tank plug
14 Distributor ring
15 Tank
16 Not allocated
17 Not allocated
18 Not allocated
19 Not allocated
20 Distributor ring
21 Hole ring
22 Hose or collapsible tank

The invention claimed is:

1. A toilet system (1) to be installed in a vehicle, wherein the toilet system comprises a base (2) that is to be firmly installed on the vehicle with an upper wall section, a toilet bowl (3) supported by the upper wall section of the base with a top edge section that supports a seat (6), a sewage retaining tank (15) that is in the usage position provided at least partly below the upper wall section and a guiding, holding and coupling device that is so designed, that the correspondingly shaped sewage retaining tank can be pulled out from the usage position in which it can be fluid-tight connected with the outlet of the toilet bowl (3) by the user, removed from the vehicle and afterwards brought again to the said usage position, while the toilet system (1) is so designed that even after the firm installation of the base in the vehicle the user can select between various intended sitting positions on the toilet bowl (3) in which the toilet system (1) can be used, wherein the toilet bowl (3) in a position that is predetermined relative to the base is firmly joined with the base (2), at least the top edge section of the toilet bowl (3) is essentially round and the seat (6) can be brought into various positions on the toilet bowl (3) relative to the vertical axis of the top edge section and the seat is essentially round, so that the seat does not determine a preferred sitting position, but the user can sit on the toilet in various positions which are rotated relative to the vertical axis of the top edge section without perceivable differences as far as sitting comfort is concerned,
wherein the top edge section of the toilet bowl (3) is overlapped in various rotated positions by a cover ring (4), said cover ring supporting on one side a mounting section (5), on which the seat (6) and a lid (7) covering the opening of the seat is hinged in an upward and downward pivotable manner, and
wherein between the cover ring (4) and the toilet bowl (3) a distributor ring (20), is provided that forms a channel system in such a manner, that it guides the flushing water from a central flushing water storage along the top edge section of the toilet pan and introduces it into the toilet pan (3a) through corresponding orifices (23) around the top edge section, through a gap between the cover ring overlapping the distributor ring and the toilet pan (3a).

2. A toilet system (1) according to claim 1, wherein the cover ring (4) is so constructed and held on the top edge section that it, together with the seat (6) held on it, and the lid (7) held on it, can be rotated by the user of the toilet to a position considered temporarily as comfortable by the individual user.

3. A toilet system (1) according to claim 2, wherein the cover ring (4) moves on the top edge section in the manner of a rotatable sliding guide that is blocked by a locking mechanism, while the locking mechanism can be deactivated by the user of the toilet without any tools, so that to rotate the cover ring without removing it from the top edge section.

4. A toilet system (1) according to claim 1, wherein the lid (7), in the closed state essentially covers only the opening of the seat (6), while at least a substantial portion of the seat (6) on the left and right (7L, 7R) of the lid (7) is not overlapped by the lid, but remains free even in the case of a closed lid.

5. A toilet system (1) according to claim 1, wherein the openings are constructed as local holes which, by considering the nominal supply pressure of the flushing water are so dimensioned and directed that the flushing water is sprayed curtain-like into the toilet pan (3a) in a form of a plurality of single jets, the toilet pan essentially extending along the entire periphery of the top edge section in such a manner, that all surface areas of the toilet pan (3a), on which solid feces can be deposited when the toilet system (1) is used as intended, will be swept over.

6. A toilet system (1) according to claim 5, wherein the holes have a configuration that inhibits permanent calcium deposits.

7. A toilet system (1) according to claim 6, wherein the distributor ring is a two-component part from a carrier plastic material and a soft-elastic material in such a manner, that the holes, forming the exiting flushing water jets are moulded into the supporting plastic material and on their edges, bordering their outlet openings, carry a bead (24) from soft-elastic material, while the bead (24) protrudes into the interior of the distributor ring.

8. A toilet system (1) according to claim 1, wherein the internal surface of the toilet pan (3a) that is subjected to feces has in all places an adequate incline relative to the outlet of the toilet pan (3a), so that to form a slope for the essentially automatic sliding off of solid feces towards the outlet.

9. A toilet system (1) according to claim 8, wherein the internal surface of the toilet pan that is subjected to feces and the entire toilet pan is made from sanitary ceramics.

10. A toilet system (1) according to claim 8, wherein the internal surface of toilet pan that is subjected to feces is fitted with a hygiene coating or with a permanently bonded hygiene coating, in the form of a dirt-repellent nano-coating.

11. A toilet system (1) according to claim 1, wherein the base (2) has a wall, in the form of a vertical front wall, that is so harmonised with the sewage tank (15) that the wall has an actuating opening, in which opening in the operating position of the sewage tank (15) the handle (12) on the sewage tank to actuate a plug (13) appears, by means of which the sewage tank (15) and consequently the fluid-tight connection between the sewage tank and the outlet of the toilet bowl (3) can be opened and closed.

12. A toilet system (1) according to claim 11, wherein in the region of the actuating opening a pivotable flap (25) is provided, that is pushed upward during the insertion of the sewage tank (15) and is held by the sewage tank (15) in its open position outside of the actuating opening and after the removal of the sewage tank pivots back into the actuating opening and closes this off, as airtight as possible.

13. A toilet system (1) according to claim 12, wherein a signal is emitted by the flap (25), indicating that the toilet system cannot be operated due to the removed tank.

14. A toilet system (1) according to claim 1, wherein the projection of the toilet bowl (3) in the vertical direction from above essentially does not extend beyond the basic area of the base (2).

15. A vehicle, in particular a camping vehicle with a toilet system (1) according to claim 1.

16. The use of a toilet system (1) according to claim 1 to fit a vehicle with a toilet provided in a narrow wet area, the sitting position of which is not determined permanently to a single regular sitting position by the installed position of the sewage tank.

17. A toilet system (1) according to claim 1, wherein the sewage retaining tank can be pulled out from the usage position by the user from the outside of the vehicle.

18. A toilet system (1) according to claim 1, wherein the cover ring (4) can be installed and locked without any tools.

* * * * *

UNITED STATES PATENT AND TRADEMARK OFFICE
CERTIFICATE OF CORRECTION

PATENT NO.       : 8,499,368 B2
APPLICATION NO. : 12/526803
DATED            : August 6, 2013
INVENTOR(S)      : Wunderlich et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 679 days.

Signed and Sealed this

Fifteenth Day of September, 2015

Michelle K. Lee
*Director of the United States Patent and Trademark Office*